(12) United States Patent
Yang et al.

(10) Patent No.: US 11,443,162 B2
(45) Date of Patent: Sep. 13, 2022

(54) RESOURCE CONSTRAINED NEURAL NETWORK ARCHITECTURE SEARCH

(71) Applicant: Google LLC, Mountain View, CA (US)

(72) Inventors: Ming-Hsuan Yang, Sunnyvale, CA (US); Xiaojie Jin, Palo Alto, CA (US); Joshua Foster Slocum, San Francisco, CA (US); Shengyang Dai, Dublin, CA (US); Jiang Wang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 587 days.

(21) Appl. No.: 16/549,715

(22) Filed: Aug. 23, 2019

(65) Prior Publication Data

US 2021/0056378 A1    Feb. 25, 2021

(51) Int. Cl.
*G06N 3/04* (2006.01)
*G06N 20/00* (2019.01)
*G06F 16/901* (2019.01)

(52) U.S. Cl.
CPC ........... *G06N 3/04* (2013.01); *G06F 16/9024* (2019.01); *G06N 20/00* (2019.01)

(58) Field of Classification Search
CPC .. G06N 3/04; G06N 3/02; G06N 3/08; G06N 3/082
See application file for complete search history.

(56) References Cited

U.S. PATENT DOCUMENTS

| | | | |
|---|---|---|---|
| 2019/0026639 A1* | 1/2019 | Vasudevan | G06T 7/0002 |
| 2019/0354837 A1* | 11/2019 | Zhou | G06N 3/0445 |

(Continued)

OTHER PUBLICATIONS

Tan Mingxing et al: "MnasNet: Pl atform-Aware Neural Architecture Search for Mobile", 2819 IEEE/CVF Conference on Computer Visi on and Pattern Recognition (CVPR), IEEE, Jun. 15, 2819 (2819-86-15), pp. 2815-2823, XP833687287, DOI: 18.1189/CVPR.2819.88293 [retri eved on 2828-81-88] abstract; figures 1-5 p. 2815, 1 eft-hand column, line 1—p. 2822, right-hand col umn, 1 ast line.

(Continued)

*Primary Examiner* — Samuel G Neway
(74) *Attorney, Agent, or Firm* — Honigman LLP; Brett A. Krueger (57) ABSTRACT

Methods, and systems, including computer programs encoded on computer storage media for neural network architecture search. A method includes defining a neural network computational cell, the computational cell including a directed graph of nodes representing respective neural network latent representations and edges representing respective operations that transform a respective neural network latent representation; replacing each operation that transforms a respective neural network latent representation with a respective linear combination of candidate operations, where each candidate operation in a respective linear combination has a respective mixing weight that is parameterized by one or more computational cell hyper parameters; iteratively adjusting values of the computational cell hyper parameters and weights to optimize a validation loss function subject to computational resource constraints; and generating a neural network for performing a machine learning task using the defined computational cell and the adjusted values of the computational cell hyper parameters and weights.

20 Claims, 4 Drawing Sheets

(56) References Cited

U.S. PATENT DOCUMENTS

2020/0104688 A1* 4/2020 Benyahia ............. G06N 3/0445
2021/0056378 A1* 2/2021 Yang ...................... G06N 20/00

OTHER PUBLICATIONS

Yanqi Zhou et al: "Resource-Efficient Neural Architect", arxiv.org, Cornell University Libra Ry, 281 Olin Library Cornell University Ithaca, NY 14853, Jun. 12, 2818 (2818-86-12), XP888892856, abstract p. 1, line 1—p. 9, l ast line, p. 13, line 1—p. 14, l ast line.
Xiaoj Iejin et al: "RC-DARTS: Resource Constrained Differentiable Architecture Search", arxiv.o rg, Cornell University Libra Ry, 281 Olin Library Cornell University Ithaca, NY 14853, Dec. 38, 2819 (Dec. 38, 2819), XP881567868, abstract p. 1, line 1—p. 13, l ast line.
International Search Report and Written Opinion for the related Application No. PCT/US2020/047073, dated Nov. 26, 2020.
Baker, et al., "Accelerating neural architecture search using performance prediction," International Conference on Learning Representations, arXiv:1705.10823, 2017.
Baker, et al., "Designing neural network architectures using reinforcement learning," International Conference on Learning Representations, arXiv:1611.02167, 2016.
Brock, et al., "SMASH: one-shot model architecture search through hypernetworks," arXiv:1708.05344, 2017.
Cai, et al., "Efficient architecture search by network transformation," AAAI, arXiv:1707.04873, 2018.
DeVries and Taylor, "Improved regularization of convolutional neural networks with cutout," arXiv:1708.04552, 2017.
Dong, et al.,"DPP-Net: Device-aware progressive search for pareto-optimal neural architectures," arXiv:1806.08198, 2018.
Han, et al., "Deep compression: Compressing deep neural networks with pruning, trained quantization and huffman coding," International Conference on Learning Representations, arXiv:1510.00149, 2015.
Hannun, et al., "Deep speech: Scaling up end-to-end speech recognition," arXiv:1412.5567, 2014.
Howard, et al., "Efficient convolutional neural networks for mobile vision applications," arXiv:1704.04861, 2017.
Huang, et al., "Densely connected convolutional networks," CVPR, arXiv:1608.06993, 1:3, 2017.
Hutter, et al., "Sequential model-based optimization for general algorithm configuration," International Conference on Learning and Intelligent Optimization, 507-523. Springer, 2011.
Kim, et al., "NEMO: Neuro-evolution with multiobjective optimization of deep neural network for speed and accuracy," JMLR: Workshop and Conference Proceedings, 1:1-8, 2017.
Krizhevsky and Hinton, "Learning multiple layers of features from tiny images," Technical Report, Citeseer, 2009, 60 pages.
Krizhevsky, "Imagenet classification with deep convolutional neural networks," In Advances in Neural Information Processing Systems, 2012, 9 pages.
Liu, "Hierarchical representations for efficient architecture search," arXiv:1711.00436, 2017.
Liu, et al., "DARTS: Differentiable architecture search," arXiv:1806.09055, 2018.
Liu, et al., "Progressive neural architecture search," arXiv:1712.00559, 2017.
Negrinho and Gordon, "DeepArchitect: Automatically designing and training deep architectures," arXiv:1704.08792, 2017.
Pham, et al., "Efficient neural architecture search via parameter sharing," arXiv:1802.03268, 2018.
Real, et al., "Regularized evolution for image classifier architecture search," arXiv:1802.01548, 2018.
Real, et al.,"Large scale evolution of image classifiers," arXiv:1703.01041, 2017.
Sutskever, et al., "Sequence to sequence learning with neural networks," Advances in Neural Information Processing Systems, 2014.
Szegedy, et al., "Going deeper with convolutions," CVPR, arXiv:1409.4842, 2014.
Szegedy, et al., "Rethinking the inception architecture for computer vision," Proceedings of the IEEE Conference on Computer Vision and Pattern Recognition, pp. 2818-2826, 2016.
Tan, et al., "MnasNet: Platform-aware neural architecture search for mobile," arXiv:1807.11626, 2018.
Williams, "Simple statistical gradient-following algorithms for connectionist reinforcement learning," Machine Learning, 8(3-4):229-256, 1992.
Xie and Yuille, "Genetic CNN," ICCV, arXiv:1703.01513, 2017.
Yosinski, et al., "How transferable are features in deep neural networks?" Advances in Neural Information Processing Systems, (NIPS '14), arXiv:1411.1792, 2014.
Zhang, et al.,"ShuffleNet: An extremely efficient convolutional neural network for mobile devices," CoRR, arXiv:1707.01083, 2017.
Zhong and Liu, "Practical network blocks design with q-learning," arXiv:1708.05552, 2017.
Zoph and Le, "Neural architecture search with reinforcement learning," International Conference on Learning Representations, arXiv:1611.01578, 2016.
Zoph, et al.,"Learning transferable architectures for scalable image recognition," arXiv:1707.07012, 2017.

* cited by examiner

RESOURCE CONSTRAINED NEURAL NETWORK ARCHITECTURE SEARCH

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes an end-to-end neural architecture search framework for one-shot neural architecture search under resource constraints, where a customized network architecture can be learned for any machine learning task dataset.

In general, one innovative aspect of the subject matter described in this specification includes a method for neural network architecture search, the method including: defining a computational cell of a neural network, wherein the computational cell comprises a directed graph of nodes and edges, each node representing a respective neural network latent representation and each edge representing a respective operation that transforms a respective neural network latent representation; replacing each operation that transforms a respective neural network latent representation with a respective linear combination of candidate operations from a predefined set of candidate operations, wherein each candidate operation in a respective linear combination has a respective mixing weight that is parameterized by one or more computational cell hyper parameters; iteratively adjusting values of i) the computational cell hyper parameters, and ii) computational cell weights, to optimize a validation loss function subject to one or more computational resource constraints, comprising, for each iteration: performing an unconstrained optimization of the validation loss function to update values of the computational cell hyper parameters for a previous iteration and to obtain adjusted values of the computational cell weights; and projecting the updated values of the computational cell hyper parameters to a nearest point in a feasible set defined by the one or more resource constraints to obtain adjusted values of the computational cell hyper parameters; and generating a neural network for performing a machine learning task using the defined computational cell and the adjusted values of the computational cell hyper parameters and computational cell weights.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations generating a neural network for performing a machine learning task using the defined computational cell and the adjusted values of the computational cell hyper parameters and computational cell weights comprises: defining a discrete computational cell architecture by replacing each linear combination of candidate operations with a single operation with a largest mixing weight that is parameterized by one or more adjusted computational cell hyper parameters; and generating a neural network for performing a machine learning task using the defined discrete computational cell architecture and the adjusted values of the computational cell weights.

In some implementations generating a neural network for performing a machine learning task using the defined computational cell and the adjusted values of the computational cell hyper parameters and computational cell weights comprises stacking multiple copies of the defined computational cell, wherein each copy has a same cell architecture defined by the adjusted values of the computational cell hyper parameters.

In some implementations the method further comprises generating the multiple copies of the defined computational cell; and training each generated copy of the defined computational cell on respective training data.

In some implementations stacking multiple copies of the defined computational cell comprises interleaving one or more additional neural network layers between the copies of the defined computational cell.

In some implementations the one or more additional neural network layers comprises a connection computational cell that includes one input node and one intermediate node, and wherein the method further comprises learning the connection cell by iteratively adjusting values of i) the connection computational cell hyper parameters, and ii) connection computational cell weights, to optimize the validation loss function subject to one or more computational resource constraints.

In some implementations the validation loss function represents a measure of error obtained after running a validation dataset through the defined computational set.

In some implementations iteratively adjusting values of i) the computational cell hyper parameters, and ii) computational cell weights, to optimize a validation loss function comprises performing a bi-level optimization of the validation loss function and a training loss function that represents a measure of error obtained on training data, wherein the computational cell hyper parameters comprise upper level parameters and the computational cell weights comprise lower level parameters.

In some implementations the one or more computational resource constraints comprise user defined constraints on one or more of memory, number of float point operations, or inference speed.

In some implementations iteratively adjusting values of i) the computational cell hyper parameters, and ii) computational cell weights, to optimize a validation loss function subject to one or more computational resource constraints comprises: defining a respective cost function for each computational resource constraint, wherein each defined cost function maps the computational cell hyper parameters to a respective resource cost.

In some implementations a respective resource cost of an edge in the computational cell is calculated as a softmax over the costs of operations in the candidate set of operations.

In some implementations the method further comprises setting lower and higher bound constraints for each defined cost function.

In some implementations performing an unconstrained optimization of the validation loss function to update values of the computational cell hyper parameters for a previous iteration and to obtain adjusted values of the computational cell weights comprises iteratively performing the unconstrained optimization of the validation loss function, comprising, for each iteration obtaining values of the computational cell hyper parameters and computational cell weights for the iteration, comprising obtaining randomly initialized values of the computational cell hyper parameters and the computational cell weights for a first iteration or obtaining values of the computational cell hyper parameters and the computational cell weights from a previous iteration; iteratively, for a predetermined number of iterations or until predefined convergence criteria are met: fixing the obtained values of the computational cell hyper parameters for the iteration and obtaining updated computational cell weights based on a gradient of a training loss function with respect to the computational cell weights; and fixing the updated computational cell weights and obtaining the updated values of the computational cell hyper parameters based on a gradient of the validation loss function with respect to the computational cell hyper parameters.

In some implementations fixing the updated computational cell weights and obtaining updated computational cell hyper parameters based on a gradient of the validation loss function with respect to the computational cell hyper parameters comprises assuming that the computational cell hyper parameters and the computational cell weights are independent.

In some implementations projecting the updated values of the computational cell hyper parameters to a nearest point in a feasible set defined by the one or more resource constraints comprises identifying an element in the feasible set that minimizes a 2-norm of the difference between i) the updated values of the computational cell hyper parameters, and ii) the element.

In some implementations the predefined set of candidate operations comprises pooling operations, convolutional operations or connection operations.

In some implementations the method further comprises defining multiple computational cells of the neural network, wherein each defined computational cell can be represented by a respective directed graph of nodes and edges; for each defined computational cell of the multiple defined computational cells: replacing each operation that transforms a respective neural network latent representation with a respective linear combination of candidate operations from a predefined set of candidate operations, wherein each candidate operation in a respective linear combination has a respective mixing weight that is parameterized by one or more computational cell hyper parameters; iteratively adjusting values of i) the computational cell hyper parameters, and ii) computational cell weights, to optimize a validation loss function subject to one or more computational resource constraints, comprising, for each iteration: performing an unconstrained optimization of the validation loss function to update values of the computational cell hyper parameters for a previous iteration and to obtain adjusted values of the computational cell weights; and projecting the updated values of the computational cell hyper parameters to a nearest point in a feasible set defined by the one or more resource constraints to obtain adjusted values of the computational cell hyper parameters; and generating a neural network for performing a machine learning task using the defined multiple computational cells and the adjusted values of the respective computational cell hyper parameters and computational cell weights.

In some implementations the method further comprises training the generated neural network on training data to obtain a trained neural network; and performing the machine learning task using the trained neural network.

The subject matter described in this specification can be implemented in particular embodiments so as to realize one or more of the following advantages.

A system implementing the presently described techniques can learn neural network architectures that satisfy task dependent resource constraints, such as model size and computational complexity. For example, the system can learn lightweight neural network architectures that can be efficiently implemented by mobile platforms with constrained computing resources.

In addition, lightweight neural network architectures can be learned under resource constraints without compromising the quality of the neural network architecture, e.g., its accuracy and performance. For example, learned neural network architectures can achieve state of the art performance in terms of accuracy, model size and complexity. The presently described techniques for performing neural network architecture search can also achieve improved neural architecture search speed.

In addition, the techniques described in this specification are not limited to particular machine learning applications—a system implementing the presently described techniques can learn customized neural network architectures for any particular machine learning task and dataset. The presently described techniques are also suitable for one-shot resource constrained neural architecture searches.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Designing and implementing neural network architectures for performing machine learning tasks such as image recognition, speech recognition or language modelling can be a time-consuming and costly process that requires expert knowledge and experience in the field.

One example technique for automating the design of neural network architectures is Neural Architecture Search (NAS). NAS techniques can be categorized into two main groups. The first group of NAS techniques use black-box optimization approaches, e.g., reinforcement learning or genetic algorithms to optimize a reward function. Such techniques typically require the training of thousands of deep learning models to learn a neural network architecture, and therefore incur large computational costs. In addition, NAS techniques that use black-box optimization are computationally too expensive for one-shot NAS. One-shot NAS is important for resource constrained applications because different tasks require different neural network architectures. For example, for a simple problem such as classifying image color, a simple neural network architecture, e.g., a two-layer neural network. On the other hand, classifying cats and dogs from images requires a complex neural network.

The second group of NAS techniques formulate the neural architecture search task as a differentiable optimization problem and utilize gradient descent to find an optimal solution. NAS techniques in the second group are typically more computationally efficient compared to NAS techniques in the first group.

This specification describes end-to-end resource constrained differentiable architecture search framework for one-shot NAS. Differentiable architecture search tasks are formulated as constrained optimization tasks by including resource constraints, where the search space for the resource constrained optimization task is mapped to a continuous search space to enable the application of gradient descent methods. An iterative projection algorithm is applied to solve the constrained optimization task and learn neural network architectures in a feasible set defined by the constraints. A multi-level search strategy can be applied to learn different architectures for neural network layers at different depths.

The neural network architectures learned by the presently described techniques can be configured to receive any kind of digital data input and to generate any kind of score, classification, or regression output based on the input.

For example, if the inputs to a neural network defined by the neural network architecture are images or features that have been extracted from images, the output generated by the neural network for a given image may be scores for each of a set of object categories, with each score representing an estimated likelihood that the image contains an image of an object belonging to the category.

As another example, if the inputs to a neural network defined by the neural network architecture are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to a neural network defined by the neural network architecture are features of an impression context for a particular advertisement, the output generated by the neural network may be a score that represents an estimated likelihood that the particular advertisement will be clicked on.

As another example, if the inputs to a neural network defined by the neural network architecture are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to a neural network defined by the neural network architecture is a sequence of text in one language, the output generated by the neural network may be a score for each of a set of pieces of text in another language, with each score representing an estimated likelihood that the piece of text in the other language is a proper translation of the input text into the other language.

As another example, if the input to a neural network defined by the neural network architecture is a sequence representing a spoken utterance, the output generated by the neural network may be a score for each of a set of pieces of text, each score representing an estimated likelihood that the piece of text is the correct transcript for the utterance.

Example Hardware

Figure 1:
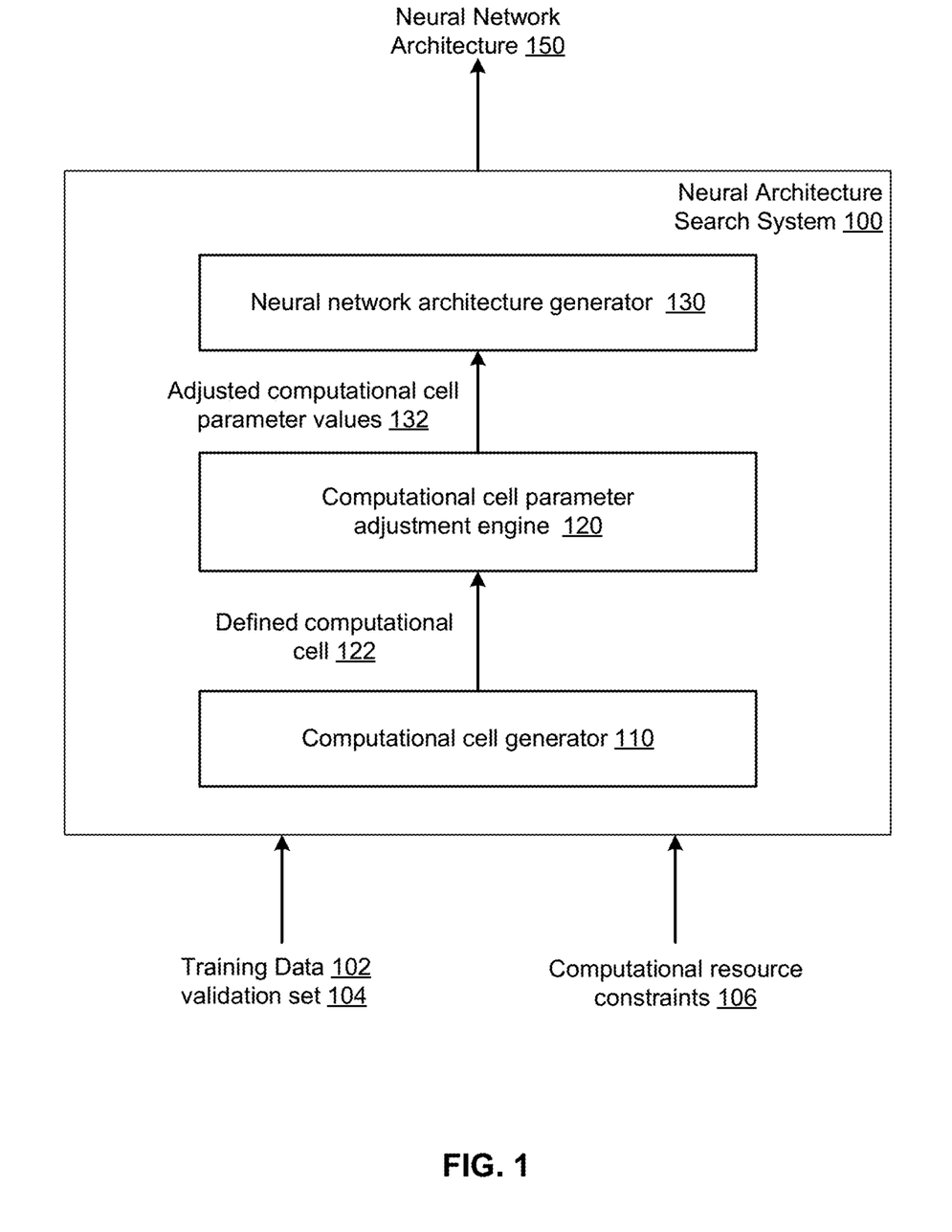
FIG. 1 shows an example neural network architecture search system.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that receives training data 102 for training a neural network to perform a particular machine learning task, a validation set 104 for evaluating the performance of the neural network on the particular machine learning task, and data specifying resource constraints 106 of a computational device implementing the neural network when performing the particular machine learning task.

The neural architecture search system 100 uses the training data 102 and the validation set 104 to determine a neural network architecture for a neural network that is configured to perform the particular task. The architecture defines the number of layers in the neural network, the operations performed by each of the layers, and the connectivity between the layers in the neural network, i.e., which layers receive inputs from which other layers in the neural network. Generally, the training data 102 and the validation set 104 both include a set of neural network inputs and, for each network input, a respective target output that should be generated by the neural network to perform the particular task. For example, a larger set of training data may have been randomly partitioned to generate the training data 102 and the validation set 104.

The neural architecture search system 100 uses the resource constraints when determining a neural network architecture for a neural network that is configured to perform the particular task. That is, the neural architecture search system 100 learns a neural network architecture under the resource constraints. Example resource constraints include but are not limited to amount of available memory, number of float point operations, inference speed, or model size. Learning a neural network under resource constraints is particularly useful for mobile platforms and real time applications.

The system 100 can receive the training data 102, the validation set 104, and the computational resource constraints in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. The system 100 can also receive user defined computational resource constraints as an upload from a remote user of the system over a data communication network, e.g., using an application programming interface (API) made available by the system 100.

As another example, the system 100 can receive an input from a user specifying which data that is already maintained by the system 100 should be used for training the neural network, and then divide the specified data into the training data 102 and the validation set 104. Similarly, the system 100 can receive an input from a user specifying which of multiple resource constraints maintained by the system 100 should be used for determining the neural network architecture.

The neural architecture search system 100 includes a computational cell generator 110, a computational cell parameter adjustment engine 120, and a neural network architecture generator 130.

The computational cell generator 110 is configured to define computational cells of the neural network whose neural network architecture is being determined by the system 100. Computational cells defined by the computational cell generator 110 are architectural building blocks, e.g., a sub networks, of the neural network whose neural network architecture is being determined by the system 100. For example, multiple instances of defined computational cells with respective learned architectures and independently learned weights can be stacked to generate a deeper neural network.

Computational cells defined by the computational cell generator 110 can each be represented as a respective directed acyclic graph $G=(V, E)$ of a predetermined number of nodes V and edges E. Each node $x_i \in V$ in a computational cell represents a latent representation, e.g., a feature map in convolutional networks. Each directed edge (i j) is associated with an operation $O_{i,j}$. The operation $O_{i,j}$ transforms node $x_i$, e.g., the operation takes the latent representation $x_i$ as input and outputs the latent representation $x_j$. Each node can be computed based on all of its predecessors' transformed outputs, e.g., $x_j = \Sigma_{i<j, i \in \mathcal{A}_j} O_{i,j}(x_i)$ where $\mathcal{A}_j$ represents the set of predecessors of $x_j$. An example computational cell is illustrated and described below with reference to FIG. 4.

The computational cell generator 110 can be configured to define computational cells based on the received inputs 102-106. For example, the number of nodes and edges included in a defined computational cell can depend on the machine learning task to be performed by the neural network whose neural network architecture is being determined by the system 100 and the computational resources available for implementing the neural network.

The computational cell parameter updating engine 120 is configured to receive data representing defined computational cells 122 from the computational cell generator 110. The computational cell parameter adjustment engine 120 is configured to iteratively adjust values of computational cell hyper parameters and computational cell weights to optimize a validation loss function subject to the resource constraints 106. Adjusting values of the computational cell hyper parameters and computational cell weights to optimize a validation loss function subject to the resource constraints 106 includes implementing a continuous relaxation strategy to map the architecture search space from a discrete search space defined by a predefined discrete set of candidate operations $O_{i,j}$ to a continuous search space, so that the architecture can be determined using gradient descent. A constrained optimization problem on the continuous search space is then performed to determine the adjusted values of computational cell hyper parameters and computational cell weights that optimize the validation loss function. Operations performed by the computational cell parameter updating engine 120 are described in more detail below with reference to FIGS. 2 and 3.

The neural network architecture generator 130 is configured to receive data representing adjusted computational cell parameter values, e.g., hyper parameters and weights, from the computational cell parameter adjustment engine 120. The neural network architecture generator 130 is configured to determine a neural network architecture using the adjusted computational cell parameter values (and the defined computational cell 122). For example, the neural network architecture generator 130 can determine a neural network architecture as being equal to a stack of multiple copies of the defined computational cells, where the architecture of each copy of a computational cell has a cell architecture defined by the adjusted computational cell hyper parameters 132. In some cases the neural network architecture generator 130 can include additional layers, e.g., one or more filter layers, between stacks of computational cells in the determined neural network architecture. Determining a neural network architecture using defined computational cells and learned computational cell parameters is described in more detail below with reference to FIG. 2.

The neural network search system 100 can output architecture data 150 that specifies the architecture of the neural network, i.e., data specifying the layers that are part of the neural network, the connectivity between the layers, and the operations performed by the layers. For example, the neural network search system 100 can output the architecture data 150 to the user that submitted the training data and the resource constraints. The user can then use a resource constrained device to train an instance of the neural network having the determined architecture and use the trained neural network to process neural network inputs.

In some implementations, instead of or in addition to outputting the architecture data 150, the system 100 trains an instance of the neural network having the determined architecture, e.g., either from scratch or to fine-tune the parameter values generated as a result of training the neural network having the architecture, and then uses the trained neural network to process requests received by users, e.g., through the API provided by the system. That is, the system 100 can receive inputs to be processed, use the trained neural network to process the inputs, and provide the outputs generated by the trained neural network or data derived from the generated outputs in response to the received inputs.

Programming the Hardware

Figure 2:
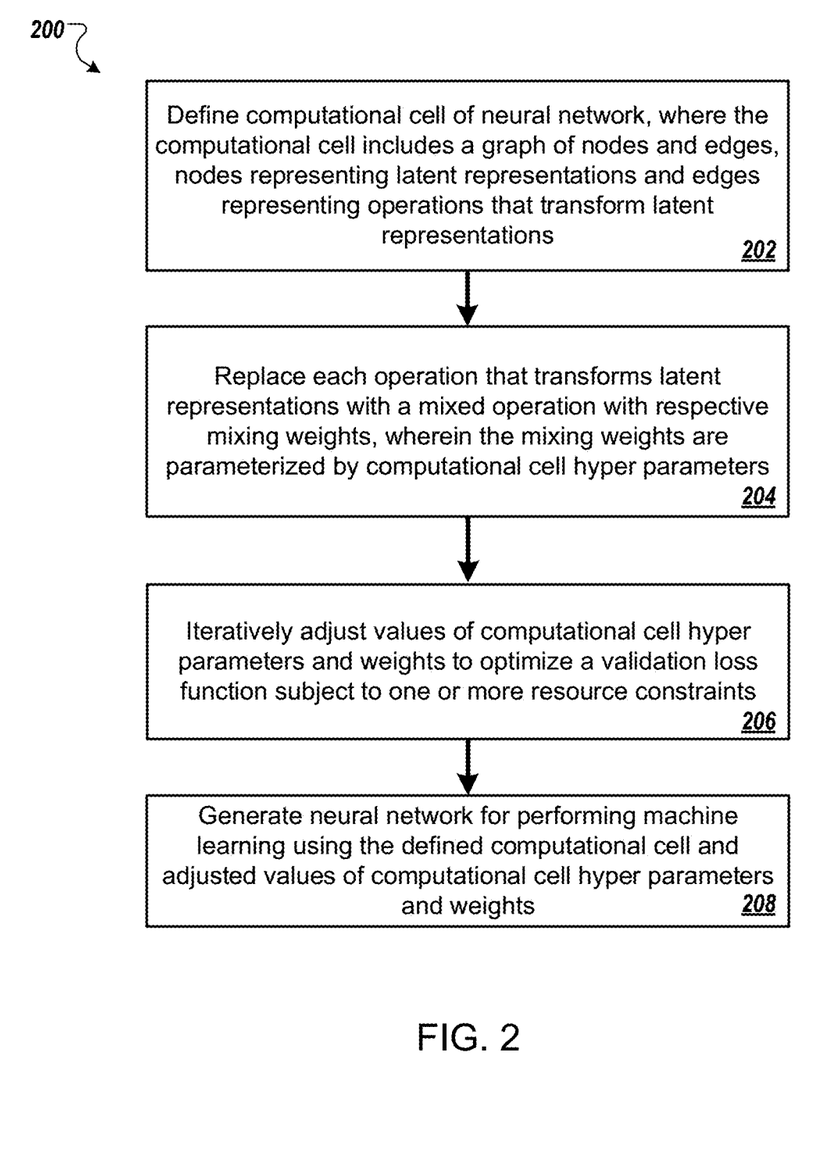
FIG. 2 is a flow diagram of an example process for generating a neural network for performing a machine learning task.

FIG. 2 is a flow diagram of an example process 200 for generating a neural network for performing a machine learning task. For convenience, the process 200 will be described as being performed by a system of one or more computers located in one or more locations. For example, a neural architecture search system, e.g., the neural architecture search system 100 of FIG. 1, appropriately programmed in accordance with this specification, can perform the process 200.

The system defines a computational cell for the neural network (step 202). The computational cell can be viewed as an architectural building block, e.g., a sub network, of the neural network generated by example process 200. For example, as described in more detail below with reference to step 206, multiple instances of the defined computational cell with a same learned architecture and independently learned weights can be stacked to generate a deeper neural network.

The defined computational cell can be represented as a directed acyclic graph $G=(V,E)$ of a predetermined number of nodes V and edges E. Each node $x_i \in V$ in the computational cell represents an latent representation, e.g., a feature map in convolutional networks. Each directed edge (i j) is associated with an operation $O_{i,j}$. The operation $O_{i,j}$ transforms node $x_i$, e.g., the operation takes the latent representation $x_i$ as input and outputs the latent representation $x_j$. Each node can be computed based on all of its predecessors' transformed outputs, e.g., $x_j = \Sigma_{i<j, i \in \mathcal{A}_j} O_{i,j}(x_i)$ where $\mathcal{A}_j$ represents the set of predecessors of $x_j$.

The number of nodes and edges included in the defined computational cell can depend on the machine learning task to be performed by the final generated neural network and the computational resources available for searching for the architecture of the neural network. For example, since it can be computationally expensive to search for the architecture of a whole neural network or a large sub network of a neural network on a large-scale dataset, the size of the defined computational cell can be chosen to reduce the computational costs whilst maintaining final accuracy of the neural network.

In some implementations the computational cell can include one or more input nodes and one or more output nodes, e.g., two input nodes and a single output node. Input nodes can be defined as nodes that transform outputs of previous computational cells. For example, in cases where the neural network architecture is a convolutional neural network architecture, the computational cell can be a convolutional cell and the input nodes can be defined as the cell outputs from the previous two layers, e.g., the input nodes represent input images. In cases where the neural network architecture is a recurrent neural network architecture, the computational cell is a recurrent cell and the input nodes include the input at the current step and the state carried from the previous step. Output nodes can be defined as nodes that provide an output of a computational cell. The output of a computational cell can be obtained by applying a reduction operation, e.g., concatenation, to all the nodes, e.g., $x_{N-1} = \text{concat}(x_2, \ldots, x_{N-2})$ where N represents the total number of nodes in the computational cell.

The operations associated with the directed edges are part of a discrete architecture search space $\mathcal{O}$ that includes a predefined set of operations that the neural network architecture can perform. For example, the pre-defined set of operations can include pooling operations, e.g., max pooling or average pooling, convolution operations with varying kernel sizes, e.g., separable convolutions or dilated separable convolutions, or connections, e.g., zero connections or identity connections.

The architecture search space $\mathcal{O}$ can be transformed to a continuous search space by replacing each candidate operation in the predefined set of operations $O_{i,j} \in \mathcal{O}$ with a respective linear combination of candidate operations from the predefined set of candidate operations—also referred to herein as a mixing operation $\hat{O}_{i,j}$. Each candidate operation in a respective linear combination has a respective mixing weight that is parameterized by one or more computational cell hyper parameters. In some implementations each mixing operation $\hat{O}_{i,j}$ outputs a softmax weighted sum of all possible operations in $\mathcal{O}$. An example mixing operation is given by Equation (1) below.

$$\hat{O}_{i,j}(x_i) = \sum_{o \in O} \frac{\exp(\theta_{(i,j)}^O)}{\sum_{o' \in O} \exp(\theta_{(i,j)}^{O'})} O(x_i) \qquad (1)$$

In Equation (1), where the operation mixing weights for a pair of nodes (i,j) are parameterized by a vector $\theta_{(i,j)} \in \mathbb{R}^{|\mathcal{O}|}$.

After the architecture search space $\mathcal{O}$ is transformed to a continuous search space the task of generating the neural network for performing the machine learning task includes learning the set of continuous variables $\theta = \{\theta_{(i,j)}\}$. Once the set of continuous variables have been learned, a corresponding discrete computational cell architecture can be obtained by first determining a number of strongest predecessors for node $x_j$ based on a strength of the corresponding edge, where the strength of an edge (i,j) is defined in Equation (2) below.

$$\max_{o \in O, o \neq zero} \frac{\exp(\theta_{(i,j)}^o)}{\sum_{o' \in O} \exp(\theta_{(i,j)}^{o'})} \qquad (2)$$

For example, the system can determine a number equal to the size of the set of predecessors $\mathcal{A}_j$ of $x_j$ of strongest predecessors for node $x_j$. Then, the mixing operation for edge (i,j) is replaced with a single operation with the largest mixing weight, as defined in Equation (3) below.

$$O_{(i,j)} = \underset{o \in O}{\mathrm{argmax}}\, \theta_{(i,j)}^o \text{ s.t. } i \in \mathcal{A}_j \qquad (3)$$

The system learns i) computational cell hyper-parameters that define the computational cell architecture, and ii) computational cell weights by optimizing a validation loss function (step 204).

The validation loss function $\mathcal{L}_{val}$ represents a measure of error obtained after running a set of validation data through the trained neural network. The validation loss depends on the computational cell hyper-parameters $\theta$ and neural network weights $\omega$, i.e., $\mathcal{L}_{val} = \mathcal{L}_{val}(\omega, \theta)$, and optimizing the validation loss function includes determining optimal computational cell hyper-parameters $\theta^*$ that minimize the validation loss $\mathcal{L}_{val}(\omega^*, \theta^*)$, where $\omega^* = \omega^*(\theta)$ represents computational cell weights obtained by optimizing a training loss function $\mathcal{L}_{train}$ that represents a measure of error obtained on training data (training data specific to the machine learning task to be performed by the neural network), i.e., $$\omega^* = \underset{\omega}{\mathrm{argmin}}\, \mathcal{L}_{train}(\omega, \theta^*).$$

That is, the system performs a bi-level optimization where the computational cell hyper-parameters $\theta$ are the upper level parameters and the computational cell weights $\omega$ are the lower level parameters.

The system optimizes the validation loss function subject to one or more resource constraints. The one or more resource constraints can be defined by a user based on the computational resources available when implementing the neural network generated using example process 200. For example, the system may receive as input data representing target values of different resource costs, e.g., available memory, FLOPs, or inference speed, etc.

The system can associate each user-defined resource constraint with a corresponding cost function that maps the computational cell hyper-parameters to a respective resource cost. For example, the system can create a discretized network architecture from the computational cell hyper-parameters $\theta$ according to Equation (3) and compute the cost for the discretized network to determine an exact cost of a computational cell architecture. Since the objective function of a discretized network architecture is not continuous, it is challenging to optimize the objective function using gradient descent. Therefore, the system implements a continuous relaxation strategy on the user defined resource constraints, where a cost of edge (i,j) in the defined computational cell is calculated as the softmax over all possible operations' costs, as given by Equation (4) below.

$$\Phi^m(\theta) = \sum_{i<j} \sigma(i \in \mathcal{A}_j) \cdot u_{(i,j)}^{m\ T} F(\theta_{(i,j)}) \qquad (4)$$

In Equation (4), $u_{(i,j)}^m$ represents the resource costs of all operations in $\mathcal{O}$, F represents the softmax function, $\sigma$ represents the indicator function and $\mathcal{A}_j$ represents the set of predecessor nodes for the node j.

Equation (4) uses the expectation of resource costs in a cell as an approximation to the actual cost of the discrete architecture derived from $\theta$. There are multiple advantages to using the function form in Equation (4). For example, since Equation (4) is differentiable w.r.t. $\theta$, it enables the use of gradient descent to optimize the validation loss function. As another example, Equation (4) is straightforward to implement because the resource cost of each candidate operation for the edge (i,j) is independent of the values of $\theta_{(i,j)}$. Therefore, u can be fixed and computed before training. If a more complicated resource constraint is to be implemented, such as inference speed on a particular platform, a neural network that maps architecture hyper-parameters to a resource cost can be learned.

The system can set lower bound and higher bound constraints for each cost function to prevent the model from learning oversimplified architectures. The lower bound constraints can be set to ensure that the model has sufficient representation capabilities.

To summarize, the system performs the constrained optimization given by Equation (5) below.

$$\min_\theta \mathcal{L}_{val}(\omega^*(\theta), \theta) \qquad (5)$$
$$\text{s.t. } \omega^*(\theta) = \operatorname*{argmin}_\omega \mathcal{L}_{train}(\omega, \theta)$$
$$C_L \leq \Phi(\theta) \leq C_H$$

In Equation (5), $\mathcal{L}_{train}$ represents the training loss, $\Phi(\theta) = [\Phi^0(\theta), \ldots \Phi^{M-1}(\theta)]^T$ with $\Phi^m(\theta): \mathbb{R}^{|\theta|} \mapsto \mathbb{R}$ represents a set of M cost functions, and $C_L = [C_L^0, \ldots, C_L^{M-1}]$, $C_H = [C_H^0, \ldots, C_H^{M-1}]$ represent user-defined lower and upper bounds of cost constraints, respectively. That is, the cost $\Phi^m(\theta)$ is constrained to be in the range of $(C_L^m, C_H^m)$. To optimize the validation loss function $\mathcal{L}_{val}$, the system performs an iterative projection method. The system performs an iterative projection method because the cost function with respect to $\theta$ is non-convex because of the softmax function in Equation (4), and there is no closed-form solution to the objective function.

The iterative projection method optimizes the validation loss function in two alternating phases—an unconstrained training phase that searches improved architectures by performing an unconstrained optimization of the validation loss function to learn the computational cell hyper parameters $\theta$ in a larger parameter space without constraints, and an architecture projection phase that projects the computational cell hyper parameters $\theta$ output by the unconstrained training phase to its nearest point in the feasible set defined by the constraints in Equation (5). The unconstrained training phase and architecture projection phase are described in more detail below with reference to FIG. 3.

The system generates the neural network for performing the machine learning task using the defined computational cell and learned computational cell hyper-parameters and computational cell weights (step 206).

In some implementations generating the neural network using the defined computational cell and learned computational cell hyper-parameters and computational cell weights can include stacking multiple copies of the computational cell. For example, the system can generate multiple copies of the computational cell, where each copy of the computational cell has a same cell architecture defined by the learned computational cell hyper parameters. The system can train each copy of the computational cell on a respective set of training data (specific to the machine learning task to be performed by the neural network). In this manner, the multiple copies of the computational cell have independently learned computational cell weights. The system can then stack the trained multiple copies of the computational cell to create a deeper neural network for performing the machine learning task.

In cases where the defined computational cell includes input and output nodes, stacking the trained multiple copies of the computational cell can include removing the output node in a first copy of the computational cell, removing the input nodes and output nodes of intermediate copies of the computational cell, and removing the input nodes of the last copy of the computational cell before stacking. In cases where the defined computational cell does not include input and output nodes, stacking the trained multiple copies of the computational cell can include adding one or more input nodes and an output node to the stack. In either case, the system can further add additional nodes and/or layers to the stacked trained copies of the computational cell, e.g., one or more filter layers.

In some implementations the system can implement a multi-level search strategy when performing example process 200 for generating a neural network. To implement the multi-level search strategy the system can define multiple computational cells at step 202, where each of the defined computational cells can be represented as a respective directed acyclic graph of a predetermined number of nodes and edges. That is, the defined multiple computational cells can have different architectures. The system can then perform step 204 for each of the defined computational cells, and combine learned computational cells and/or copies of learned computational cells to generate the neural network, as described with reference to step 206.

Implementing a multi-level search strategy can be advantageous for multiple reasons. For example, cells at different network depths can exhibit a large variation on the resource cost, e.g., number of parameters and number of FLOPs, because the number of channels of filters is increased wherever the resolution of input is reduced. This design is widely used in deep networks to avoid the bottleneck of information flow, where the low-level layers, i.e. layers near input, have larger FLOPs than the high-level layers while the high-level layers have larger number of parameters than low-level layers. In order to make the learned architectures satisfy given resource constraints, it can be advantageous to make the architecture of cells vary with the depths of layers. As another example, cells at different depths can have different effects on a network's overall performance, e.g., low-level layers (near input) can be more insensitive to reducing the number of parameters.

In addition, to obtain more lightweight architectures, the system can apply steps 202-204 to learn connection cells or layers between stacks of computational cells instead of predefining the connections, e.g., to be 1×1 conv. A connection cell can be formulated as described above with reference to step 202. In some implementations connection cells may include one input node and one node inside the connection cell.

Figure 3:
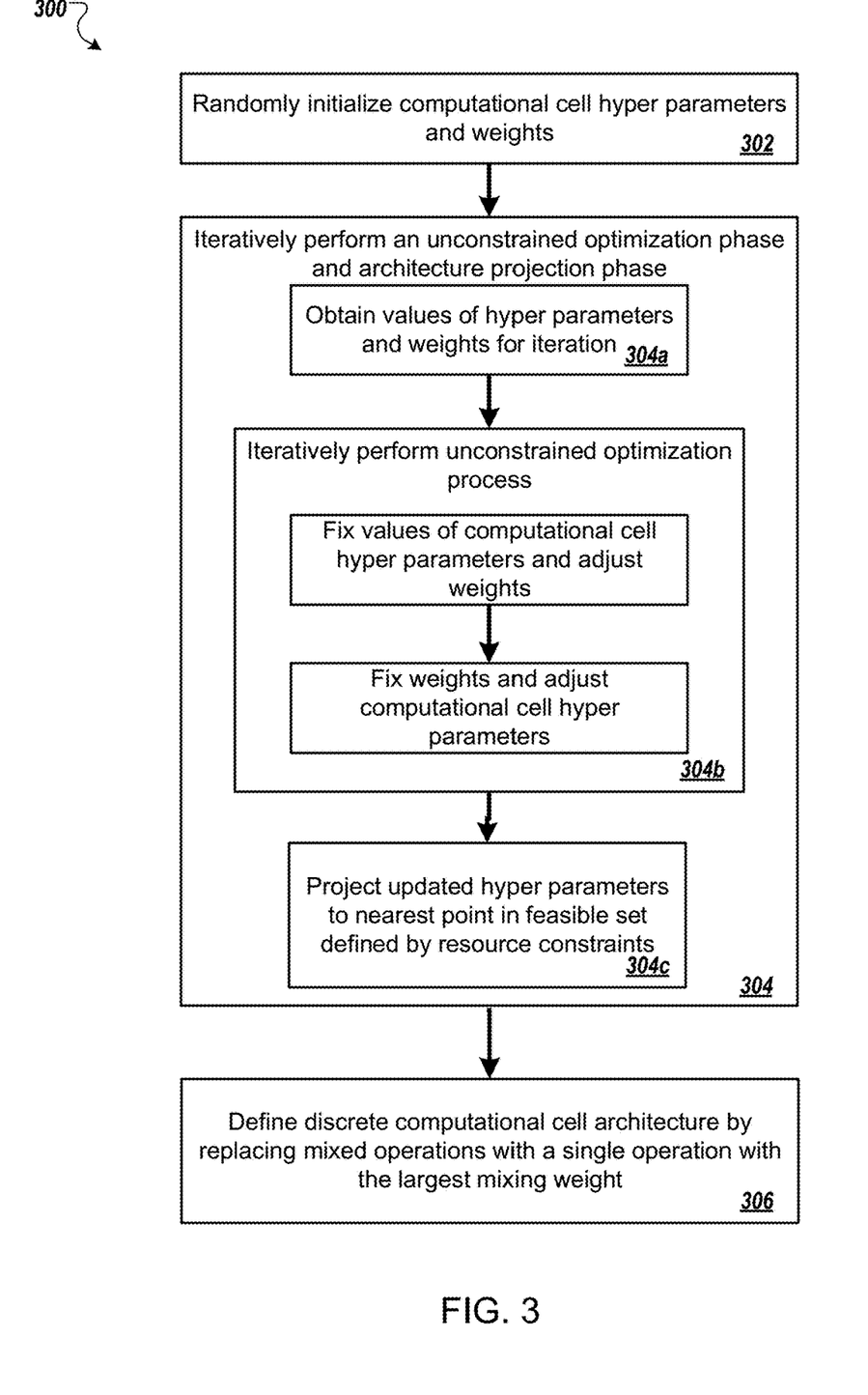
FIG. 3 is a flow diagram of an example process for performing an iterative projection method.

FIG. 3 is a flow diagram of an example process 300 for performing the iterative projective method described above with reference to FIG. 2. For convenience, the process 300 will be described as being performed by a system of one or more computers located in one or more locations. For example, a neural architecture search system, e.g., the neural architecture search system 100 of FIG. 1, appropriately programmed in accordance with this specification, can perform the process 300.

The system randomly initializes the values of the computational cell hyper parameters $\theta=\theta_0$ and the computational cell weights $\omega=\omega_0$ (step 302).

The system iteratively performs an unconstrained training process (i.e., an unconstrained optimization of the validation loss function, as described below) and an architecture projection process for a predetermined number of iterations or until predefined convergence criteria are met (step 304). For example, each iteration can include an implementation of the unconstrained training process directly followed by an implementation of the architecture projection process.

For each iteration, the system obtains computational cell hyper parameters $\theta_t$ and computational cell weights $\omega_t$ for the iteration (step 304a). In cases where the iteration is a first iteration of the iterative projection method, the system can obtain the randomly initialized computational cell hyper parameters $\theta_t=\theta_0$ and the randomly initialized computational cell weights $\omega_t=\omega_0$. In cases where the iteration is a subsequent iteration of the iterative projection method, the system can receive computational cell hyper parameters $\theta_{t-1}$ and computational cell weights $\omega_{t-1}$ from the previous iteration $t-1$ of the iterative projection method.

The system performs the unconstrained training process by determining adjusted computational cell hyper-parameters that optimize (minimize) the validation loss $\mathcal{L}_{val}(\omega^*, \theta)$ defined above with reference to FIG. 3 (step 304b). As described above $\omega^*=\omega^*(\theta)$ represents computational cell weights obtained by optimizing the training loss function $\mathcal{L}_{train}$. That is, the system solves the optimization problem given below in Equation (6).

$$\min_\theta \mathcal{L}_{val}(\omega^*(\theta), \theta) \qquad (6)$$

$$\text{s.t. } \omega^*(\theta) = \operatorname*{argmin}_\omega \mathcal{L}_{train}(\omega, \theta)$$

Since it is difficult to obtain an exact solution to Equation (6) for both the computational cell weights $\omega$ and the computational cell hyper-parameters $\theta$ in parallel, the system implements a coordinate gradient descent technique to iteratively and alternatively update the weights $\omega$ and the hyper parameters $\theta$ while fixing the value of the other.

For example, in a first step the system can fix the values of the received computational cell hyper parameters $\theta_t$ and obtain updated computational cell weights $\omega_{t+1}$ by descending along $\nabla_\omega \mathcal{L}_{train}(\omega_t, \theta_t)$. In a second step the system fixes the values of the computational cell weights $\omega_{t+1}$ obtained during the first step and obtains updated computational cell hyper parameters $\theta_{t+1}$ by descending along $\nabla_\theta \mathcal{L}_{val}(\omega_{t+1}, \theta_t)$. The system can iteratively perform the first step and second step for a predetermined number of iterations or until predefined convergence criteria are met. During the second step it can be assumed that $\omega$ and $\theta$ are independent for increased computational efficiency and satisfactory performance.

The system performs the architecture projection process using the adjusted computational cell hyper parameters $\theta_{t+1}$ (step 304c). The system projects the updated computational cell hyper parameters $\theta_{t+1}$ to a nearest point $\theta_p$ in the feasible set defined by the resource constraints given in Equation (5). The objective of the projection can be described by Equation (7) below.

$$\min_{\theta_p} \frac{1}{2}\|\theta_{t+1} - \theta_p\|_2^2 \quad \text{s.t. } C_L \le \Phi(\theta_p) \le C_H \qquad (7)$$

Because $\Phi(\theta_p)$ are non-convex functions of $\theta_p$, there is no closed-form solution to Equation (7). Therefore, the system transforms Equation (7) to its Lagrangian given by Equation (8) below.

$$\min_{\theta_p} h(\theta_p) = \frac{1}{2}\|\theta - \theta_p\|_2^2 + \\ \lambda_1 \sum_{m=0}^{M} \max(C_L^m - \Phi^m(\theta_p), 0) + \lambda_2 \sum_{m=0}^{M} \max(\Phi^m(\theta_p) - C_H^m, 0) \qquad (8)$$

The system performs gradient descent to optimize Equation (8). At time step $t=0$, the system sets $\theta_p^0=\theta$. At a subsequent time step t, the system obtains $\theta_p^t$ by descending $\theta_p^{t-1}$ in the direction of $\nabla_{\theta_p} h(\theta_p^{t-1})$. The system performs the updates iteratively until all constraints are satisfied or until a predetermined maximum iteration number $e_p$ is reached.

In some implementations the system sets the weighting terms $\lambda_1$ and $\lambda_2$ to be identical $\lambda_1=\lambda_2=\lambda$ for all constraints. To facilitate convergence, $\lambda$ can be set to diminish exponentially during training. At the end of training, $\lambda \rightarrow 0$ and $\theta_p:=0$. Since it is fast to compute $\nabla_{\theta_p} h(\theta_p)$ for simple resource constraints, the architecture iterative projection phase (step 404c) is faster than the unconstrained training phase (step 404b).

The system provides the computational cell parameters $\theta_p$ obtained by optimizing the Lagrangian given by Equation (8) as input for the next iteration of the unconstrained training process and architecture projection process. If the iteration is the final iteration the system provides the hyper parameters $\theta_p$ for deriving the discrete architecture described above with reference to FIG. 3 (step 306).

Performing example process 400 provides several advantages. For example, by jointly optimizing computational cell weights and computational cell hyper parameters, the system can learn an improved starting point for the architecture projection process. As another example, after the architecture projection phase is performed, the unconstrained training phase is performed to learn a computational cell architecture in a larger, unconstrained parameter space. Therefore, even if an architecture projection phase results in a sub-optimal computational cell architecture, the unconstrained training phase can still learn an improved computational cell architecture. In addition, since neural networks can be sensitive to perturbations on weights in an initial training phase, in some implementations the system can implement a warm-start strategy where the unconstrained training phase for the first iteration of the iterative projection method has a larger number of iterations of the first step and the second step compared to later iterations of the iterative projection method. This can reduce the likelihood that the model gets stuck in a bad local optimum in the architecture projection phase.

Figure 4:
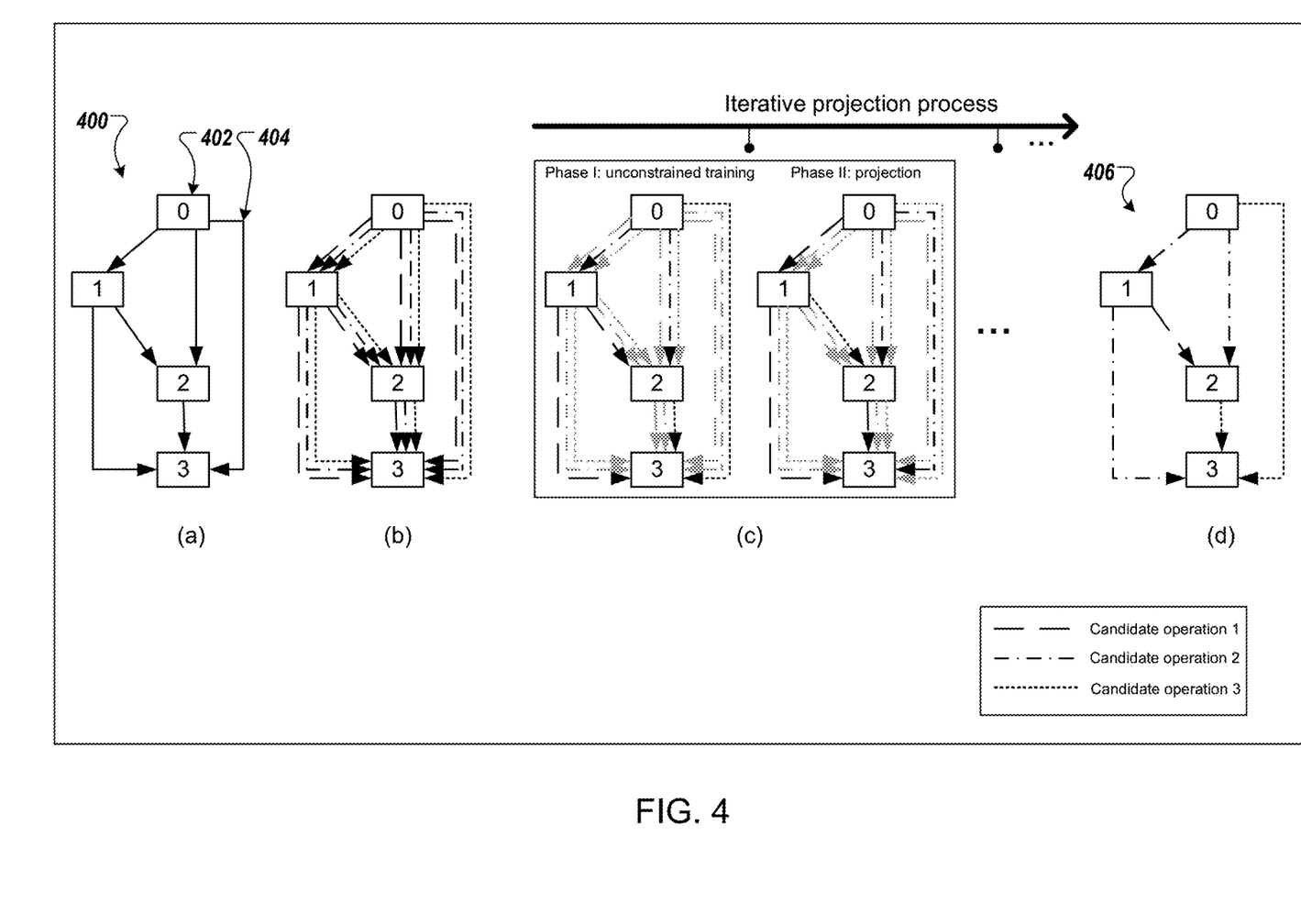
FIG. 4 is an example conceptual visualization of learning a discrete computational cell architecture Like reference numbers and designations in the various drawings indicate like elements.

FIG. 4 is an example conceptual visualization of learning a discrete computational cell architecture.

Stage (a) corresponds to step 202 of example process 200. At stage (a) an initial computational cell 400 is defined. The initial computational cell 400 includes four intermediate nodes, e.g., node 402. The initial computational cell 400 can further include one or more input nodes and an output node, but for clarity the input nodes and output nodes are omitted in FIG. 4. The initial computational cell 400 further includes six directed edges between the intermediate nodes, e.g., edge 404.

As described above with reference to Equation (1), at stage (b) the operations on each of the six edges are replaced by a mixture of all candidate operations in the predefined set of candidate operations. In the example visualization shown in FIG. 4 there are three candidate operations, however in some implementations there may be fewer or more candidate operations.

Stage (c) corresponds to step 204 of example process 200. At stage (c) the iterative projection method described above with reference to FIG. 3 is applied to solve the constrained optimization problem given by Equation (5), where the architecture parameters as well as the weights in the cell are jointly optimized to satisfy the resource constraints.

At stage (d) a final computational cell architecture 406 is derived from the learned weights in mixed operations. The computational cell can then be used to generate a neural network, as described above with reference to step 206 of example process 200.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer implemented method comprising:
    defining a computational cell of a neural network, wherein the computational cell comprises a directed graph of nodes and edges, each node representing a respective neural network latent representation and each edge representing a respective operation that transforms a respective neural network latent representation;
    replacing each operation that transforms a respective neural network latent representation with a respective linear combination of candidate operations from a predefined set of candidate operations, wherein each candidate operation in a respective linear combination has a respective mixing weight that is parameterized by one or more computational cell hyper parameters;
    iteratively adjusting values of i) the computational cell hyper parameters, and ii) computational cell weights, to optimize a validation loss function subject to one or more computational resource constraints, comprising, for each iteration:
        performing an unconstrained optimization of the validation loss function to update values of the computational cell hyper parameters for a previous iteration and to obtain adjusted values of the computational cell weights; and
        projecting the updated values of the computational cell hyper parameters to a nearest point in a feasible set defined by the one or more resource constraints to obtain adjusted values of the computational cell hyper parameters; and
    generating a neural network for performing a machine learning task using the defined computational cell and the adjusted values of the computational cell hyper parameters and computational cell weights.

2. The method of claim 1, wherein generating a neural network for performing a machine learning task using the defined computational cell and the adjusted values of the computational cell hyper parameters and computational cell weights comprises:
    defining a discrete computational cell architecture by replacing each linear combination of candidate operations with a single operation with a largest mixing weight that is parameterized by one or more adjusted computational cell hyper parameters; and generating a neural network for performing a machine learning task using the defined discrete computational cell architecture and the adjusted values of the computational cell weights.

3. The method of claim 1, wherein generating a neural network for performing a machine learning task using the defined computational cell and the adjusted values of the computational cell hyper parameters and computational cell weights comprises stacking multiple copies of the defined computational cell, wherein each copy has a same cell architecture defined by the adjusted values of the computational cell hyper parameters.

4. The method of claim 3, further comprising:
generating the multiple copies of the defined computational cell; and
training each generated copy of the defined computational cell on respective training data.

5. The method of claim 3, wherein stacking multiple copies of the defined computational cell comprises interleaving one or more additional neural network layers between the copies of the defined computational cell.

6. The method of claim 5, wherein the one or more additional neural network layers comprises a connection computational cell that includes one input node and one intermediate node, and wherein the method further comprises learning the connection cell by iteratively adjusting values of i) the connection computational cell hyper parameters, and ii) connection computational cell weights, to optimize the validation loss function subject to one or more computational resource constraints.

7. The method of claim 1, wherein the validation loss function represents a measure of error obtained after running a validation dataset through the defined computational set.

8. The method of claim 1, wherein iteratively adjusting values of i) the computational cell hyper parameters, and ii) computational cell weights, to optimize a validation loss function comprises performing a bi-level optimization of the validation loss function and a training loss function that represents a measure of error obtained on training data, wherein the computational cell hyper parameters comprise upper level parameters and the computational cell weights comprise lower level parameters.

9. The method of claim 1, wherein the one or more computational resource constraints comprise user defined constraints on one or more of memory, number of float point operations, or inference speed.

10. The method of claim 1, wherein iteratively adjusting values of i) the computational cell hyper parameters, and ii) computational cell weights, to optimize a validation loss function subject to one or more computational resource constraints comprises:
defining a respective cost function for each computational resource constraint, wherein each defined cost function maps the computational cell hyper parameters to a respective resource cost.

11. The method of claim 10, wherein a respective resource cost of an edge in the computational cell is calculated as a softmax over the costs of operations in the candidate set of operations.

12. The method of claim 10, further comprising setting lower and higher bound constraints for each defined cost function.

13. The method of claim 1, wherein performing an unconstrained optimization of the validation loss function to update values of the computational cell hyper parameters for a previous iteration and to obtain adjusted values of the computational cell weights comprises iteratively performing the unconstrained optimization of the validation loss function, comprising, for each iteration:
obtaining values of the computational cell hyper parameters and computational cell weights for the iteration, comprising obtaining randomly initialized values of the computational cell hyper parameters and the computational cell weights for a first iteration or obtaining values of the computational cell hyper parameters and the computational cell weights from a previous iteration;
iteratively, for a predetermined number of iterations or until predefined convergence criteria are met:
fixing the obtained values of the computational cell hyper parameters for the iteration and obtaining updated computational cell weights based on a gradient of a training loss function with respect to the computational cell weights; and
fixing the updated computational cell weights and obtaining the updated values of the computational cell hyper parameters based on a gradient of the validation loss function with respect to the computational cell hyper parameters.

14. The method of claim 13, wherein fixing the updated computational cell weights and obtaining updated computational cell hyper parameters based on a gradient of the validation loss function with respect to the computational cell hyper parameters comprises assuming that the computational cell hyper parameters and the computational cell weights are independent.

15. The method of claim 1, wherein projecting the updated values of the computational cell hyper parameters to a nearest point in a feasible set defined by the one or more resource constraints comprises identifying an element in the feasible set that minimizes a 2-norm of the difference between i) the updated values of the computational cell hyper parameters, and ii) the element.

16. The method of claim 1, wherein the predefined set of candidate operations comprises pooling operations, convolutional operations or connection operations.

17. The method of claim 1, further comprising:
defining multiple computational cells of the neural network, wherein each defined computational cell can be represented by a respective directed graph of nodes and edges;
for each defined computational cell of the multiple defined computational cells:
replacing each operation that transforms a respective neural network latent representation with a respective linear combination of candidate operations from a predefined set of candidate operations, wherein each candidate operation in a respective linear combination has a respective mixing weight that is parameterized by one or more computational cell hyper parameters;
iteratively adjusting values of i) the computational cell hyper parameters, and ii) computational cell weights, to optimize a validation loss function subject to one or more computational resource constraints, comprising, for each iteration:
performing an unconstrained optimization of the validation loss function to update values of the computational cell hyper parameters for a previous iteration and to obtain adjusted values of the computational cell weights; and
projecting the updated values of the computational cell hyper parameters to a nearest point in a feasible set defined by the one or more resource constraints to obtain adjusted values of the computational cell hyper parameters; and generating a neural network for performing a machine learning task using the defined multiple computational cells and the adjusted values of the respective computational cell hyper parameters and computational cell weights.

18. The method of claim 1, further comprising:
training the generated neural network on training data to obtain a trained neural network; and
performing the machine learning task using the trained neural network.

19. A system comprising one or more computers and one or more storage devices storing instructions that are operable, when executed by the one or more computers, to cause the one or more computers to perform operations comprising:

defining a computational cell of a neural network, wherein the computational cell comprises a directed graph of nodes and edges, each node representing a respective neural network latent representation and each edge representing a respective operation that transforms a respective neural network latent representation;

replacing each operation that transforms a respective neural network latent representation with a respective linear combination of candidate operations from a predefined set of candidate operations, wherein each candidate operation in a respective linear combination has a respective mixing weight that is parameterized by one or more computational cell hyper parameters;

iteratively adjusting values of i) the computational cell hyper parameters, and ii) computational cell weights, to optimize a validation loss function subject to one or more computational resource constraints, comprising, for each iteration:

performing an unconstrained optimization of the validation loss function to update values of the computational cell hyper parameters for a previous iteration and to obtain adjusted values of the computational cell weights; and projecting the updated values of the computational cell hyper parameters to a nearest point in a feasible set defined by the one or more resource constraints to obtain adjusted values of the computational cell hyper parameters; and generating a neural network for performing a machine learning task using the defined computational cell and the adjusted values of the computational cell hyper parameters and computational cell weights.

20. A computer-readable storage medium comprising instructions stored thereon that are executable by a processing device and upon such execution cause the processing device to perform operations comprising:

defining a computational cell of a neural network, wherein the computational cell comprises a directed graph of nodes and edges, each node representing a respective neural network latent representation and each edge representing a respective operation that transforms a respective neural network latent representation;

replacing each operation that transforms a respective neural network latent representation with a respective linear combination of candidate operations from a predefined set of candidate operations, wherein each candidate operation in a respective linear combination has a respective mixing weight that is parameterized by one or more computational cell hyper parameters;

iteratively adjusting values of i) the computational cell hyper parameters, and ii) computational cell weights, to optimize a validation loss function subject to one or more computational resource constraints, comprising, for each iteration:

performing an unconstrained optimization of the validation loss function to update values of the computational cell hyper parameters for a previous iteration and to obtain adjusted values of the computational cell weights; and projecting the updated values of the computational cell hyper parameters to a nearest point in a feasible set defined by the one or more resource constraints to obtain adjusted values of the computational cell hyper parameters; and generating a neural network for performing a machine learning task using the defined computational cell and the adjusted values of the computational cell hyper parameters and computational cell weights.

* * * * *